(12) United States Patent
Yeh et al.

(10) Patent No.: US 9,765,258 B2
(45) Date of Patent: Sep. 19, 2017

(54) COMPOUND OF PHOSPHOR AND THE MANUFACTURING METHOD THEREOF

(71) Applicant: EPISTAR CORPORATION, Hsinchu (TW)

(72) Inventors: Chiao-Wen Yeh, Hsinchu (TW); Ru-Shi Liu, Hsinchu (TW)

(73) Assignee: EPISTAR CORPORATION, Hsinchu (TW)

( * ) Notice: Subject to any disclaimer, the term of this patent is extended or adjusted under 35 U.S.C. 154(b) by 101 days.

(21) Appl. No.: 14/057,073

(22) Filed: Oct. 18, 2013

(65) Prior Publication Data

US 2014/0110632 A1    Apr. 24, 2014

(30) Foreign Application Priority Data

Oct. 18, 2012  (TW) .............................. 101138832 A

(51) Int. Cl.
    *C09K 11/77*    (2006.01)
    *C09K 11/08*    (2006.01)

(52) U.S. Cl.
    CPC ...... *C09K 11/7734* (2013.01); *C09K 11/0883* (2013.01)

(58) Field of Classification Search
    CPC .................................................. C09K 11/7734
    USPC .................................................... 252/301.4 F
    See application file for complete search history.

(56) References Cited

U.S. PATENT DOCUMENTS

| | | | | |
|---|---|---|---|---|
| 7,351,356 B2* | 4/2008 | Delsing | ............. | C09K 11/7734 252/301.4 S |
| 8,153,025 B2* | 4/2012 | Schmidt | ............. | C09K 11/7706 252/301.4 R |
| 8,679,367 B2* | 3/2014 | Liu | .................... | C09K 11/7728 252/301.4 F |
| 2006/0197439 A1* | 9/2006 | Sakane | ............. | C09K 11/0883 313/503 |
| 2007/0194685 A1* | 8/2007 | Hirosaki | ....................... | 313/485 |
| 2009/0236963 A1* | 9/2009 | Nagatomi | .......... | C09K 11/7721 313/483 |
| 2010/0102707 A1* | 4/2010 | Fukuda | ............. | C09K 11/0883 313/503 |
| 2010/0244076 A1* | 9/2010 | Schmidt | ............. | C09K 11/0883 257/98 |

FOREIGN PATENT DOCUMENTS

CN           101883835 A     11/2010

OTHER PUBLICATIONS

Liu. Enhanced luminescence of SrSi2O2N2 :Eu2+ phosphors by codoping with Ce3+, Mn2+, and Dy3+ ions. App. Phys. Lett. 91 061119 (2007.*
Liu, "Phosphors, Up Converison Nano Particles, Quantum Dots and Their Applications",Springer, vol. 1, 13 pages.

\* cited by examiner

*Primary Examiner* — Matthew E Hoban
(74) *Attorney, Agent, or Firm* — Ditthavong & Steiner, P.C.

(57) ABSTRACT

Provided is a metal oxonitridosilicate phosphor of a general formula $M_{5-z-a-b}Al_{3+x}Si_{23-x}N_{37-x-2a}O_{x+2a}:Eu_z,Mn_b$, wherein M is one or more alkaline earth metals; $0 \leq x$; $0 \leq a$; $0 < z \leq 0.8$; and $0 < b \leq 0.8$.

11 Claims, 4 Drawing Sheets

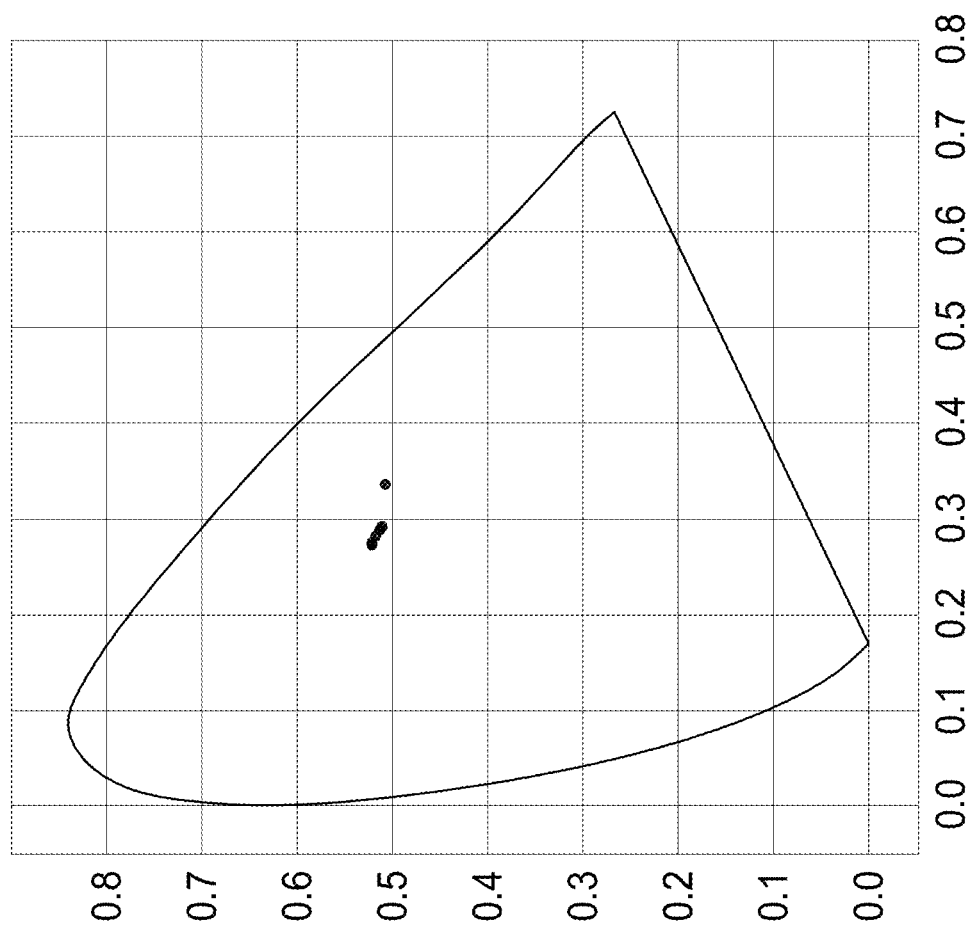

COMPOUND OF PHOSPHOR AND THE MANUFACTURING METHOD THEREOF

TECHNICAL FIELD

The present application relates to a compound of phosphor and the manufacturing method thereof, and particularly to a metal oxonitridosilicate phosphor and the manufacturing method thereof.

REFERENCE TO RELATED APPLICATION

This application claims the right of priority based on TW application Serial No. 101138832, filed on Oct. 18, 2012, and the content of which is hereby incorporated by reference in its entirety.

DESCRIPTION OF BACKGROUND ART

There are many manufacturing methods of making white light emitting diodes (WLEDs), such as applying yellow phosphors to a blue light-emitting diode chip, applying red and green phosphors to a blue light-emitting diode chip, mixing red, green, and blue light-emitting diode chips and applying tricolor blue/green/red phosphors or applying different phosphors with different colors to a light-emitting diode emitting in the UV spectral range.

Compared to a traditional incandescent light bulb, a white light-emitting diode has some advantages, e.g. long lifetime, low power consumption, small volume, fast response time and good shake-resistance, and thus light-emitting diodes are gradually replacing traditional lighting products. However, current white light emitting diodes still need to overcome the problems such as heat dissipation, inadequate brightness and relatively high price in its development. As a result, in the lighting market, auxiliary lighting, including flash lights, car interior lights, architectural decorative lighting products, is still the main market of white light-emitting diodes, while still white light-emitting diodes are expected to replace traditional lighting products in the future to become the mainstream of the global lighting market.

Besides package techniques, the chosen phosphor is also an important factor in affecting luminous efficiency of a light source. Thus, one of the research directions that solid state lighting companies are devoted to is modifying phosphor compositions to increase phosphor conversion efficiency. The color render index of the white light generated by a yellow phosphor excited by a traditional single blue chip is not good and thus the color saturation of an object illuminated by such white light is poor, thereby lowering the commercial lighting market value. After many years of research and development, it is found that using a high efficient UV-light-emitting diode (UV-LED) as an excitation light source is another way of white light emitting diodes to become lighting devices. Because the UV-LED technique is gradually mature, the phosphor development of the UV-LED excitation light source is more and more important, so as to develop phosphors matching the emission wavelength of UV-LEDs and thus manufacture white light emitting diodes with high efficiency and high brightness.

SUMMARY OF THE DISCLOSURE

A metal oxonitridosilicate phosphor has a general formula $M_{5-z-a-b}Al_{3+x}Si_{23-x}N_{37-x-2a}O_{x+2a}:Eu_z,Mn_b$, wherein M is one or more alkaline earth metals; $0 \leq x \leq 7$; $0 \leq a \leq 1$; $0 < z \leq 0.3$; and $0 < b \leq 0.3$.

A metal oxonitridosilicate phosphor has a composition of $M_{5-z-a-b}Al_{3+x}Si_{23-x}N_{37-x-2a}O_{x+2a}$ as a host lattice, Eu as a first active center and Mn as a second active center.

A metal oxonitridosilicate phosphor has a general formula $M_{5-z-a-b}Al_{3+x}Si_{23-x}N_{37-x-2a}O_{x+2a}:Eu_z,Mn_b$, wherein when M is Sr, x=2, a=0, z=0.1, $0.02 \leq b \leq 0.1$, the phosphor emits a fluorescence with a wavelength ranging from 480 nm to 700 nm when excited by a light source with a wavelength ranging from 300 nm to 460 nm.

The light source with the wavelength ranging from 300 nm to 460 nm of the present application is from a light-emitting diode or plasma.

BRIEF DESCRIPTION OF THE DRAWINGS

FIG. 4 is a CIE chromaticity diagram of the phosphor (a) in accordance with the first embodiment and the phosphors (b) to (f) in accordance with the second embodiment of the application under a 460 nm excitation.

DETAILED DESCRIPTION OF PREFERRED EMBODIMENTS

Figure 1:
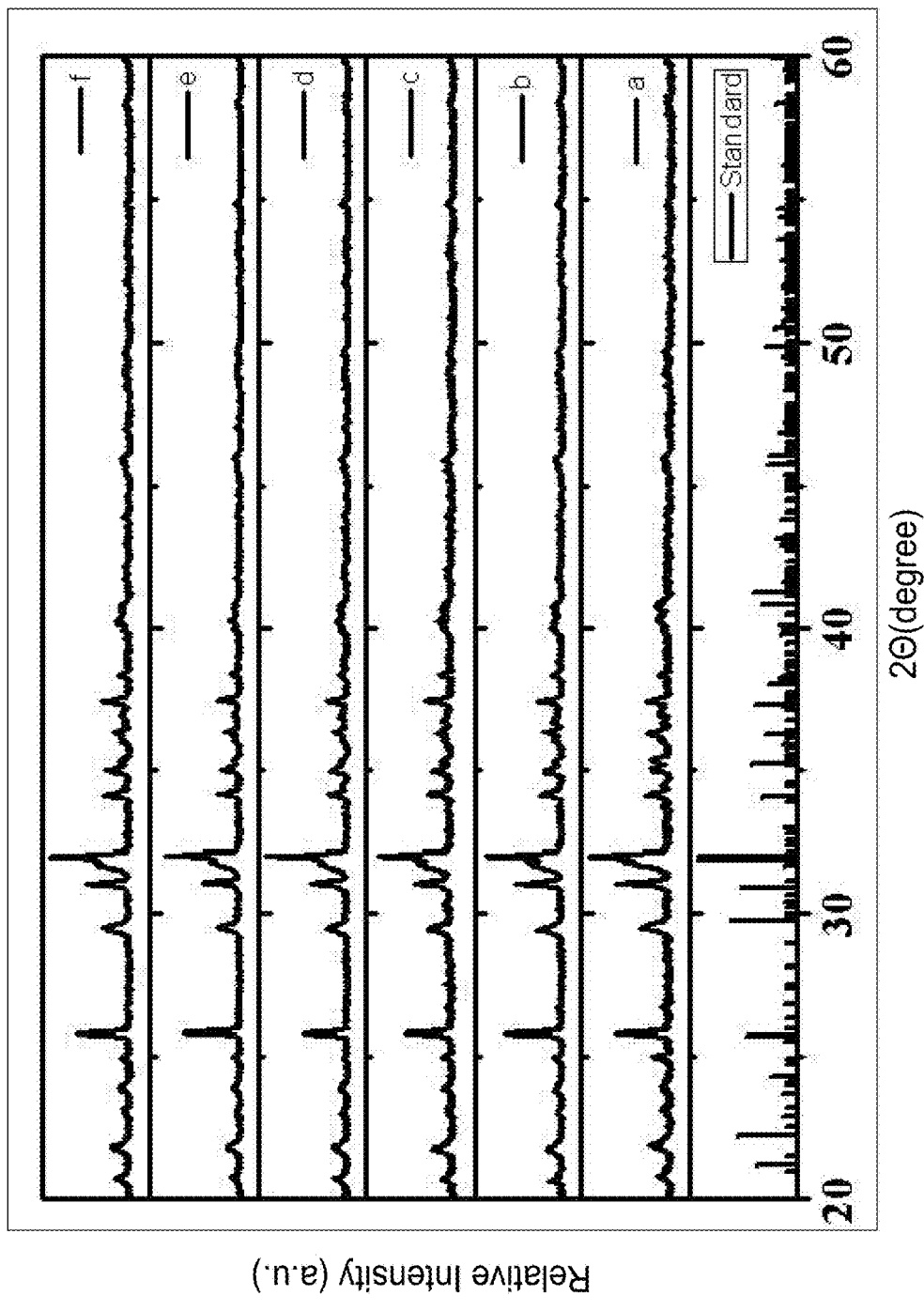
FIG. 1 is an XRD pattern of the phosphor (a) in accordance with the first embodiment, the phosphors (b) to (f) in accordance with the second embodiment of the application and a standard compound having a formula $Sr_5Al_5Si_{21}N_{35}O_2$.

Exemplary embodiments of the present application will be described in detail with reference to the accompanying drawings hereafter. The following embodiments are given by way of illustration to help those skilled in the art fully understand the spirit of the present application. Hence, it should be noted that the present application is not limited to the embodiments herein and can be realized by various forms. Further, the drawings are not precise scale and components may be exaggerated in view of width, height, length, etc. Herein, the similar or identical reference numerals will denote the similar or identical components throughout the drawings.

The embodiments of the present application provide a phosphor having a general formula $M_{5-z-a-b}Al_{3+x}Si_{23-x}N_{37-x-2a}O_{x+2a}:Eu_z,Mn_b$, wherein M is one or more alkaline earth metals; $0 \leq x \leq 7$; $0 \leq a \leq 1$; $0 < z \leq 0.3$; and $0 < b \leq 0.3$. $M_{5-z-a-b}Al_{3+x}Si_{23-x}N_{37-x-2a}O_{x+2a}$ of the phosphor is a host lattice, Eu is a first active center, and Mn is a second active center.

First Embodiment

The present embodiment is a comparative embodiment of the metal oxonitridosilicate phosphor (a), wherein M is Sr, x=2, a=0, z=0.1, b=0, namely, the phosphor is $Sr_{4.9}Al_5Si_{21}N_{35}O_2:Eu_{0.1}$. The phosphor is prepared by solid-state reaction at high pressure, and the method is shown as follows.

First, a stoichiometric first reactant comprising Sr, such as $Sr_3N_2$; a stoichiometric second reactant comprising Al, such as AlN; a stoichiometric third reactant comprising Si, such as $Si_3N_4$ or $SiO_2$; and a stoichiometric fourth reactant comprising Eu, such as EuN are provided to form a mixture having a formula $Sr_{4.9}Al_5Si_{21}N_{35}O_2:Eu_{0.1}$.

Second, a pestle is used to grind and mix the mixture uniformly, and subsequently the uniform mixture is put into a boron nitride crucible, and then the boron nitride crucible is put into a high-temperature sintering furnace to carry out a sintering step under a temperature ranging from 1700° C. to 2300° C. for 3 to 8 hours, so as to form the metal oxonitridosilicate phosphor. More specifically, the mixture is heated to the temperature ranging from 1700° C. to 2300° C. at a heating rate of 35° C./minute under nitrogen atmosphere at a pressure ranging from 0.5 to 1.5 Mpa, and then the mixture is kept for 3 to 8 hours, and subsequently the mixture was cooled down to room temperature at a cooling rate of 15° C./minute. After the sintering step, a pestle is used again to grind the metal oxonitridosilicate phosphor into powders having uniform particle sizes after the metal oxonitridosilicate phosphor is taken out from the high-temperature sintering furnace.

The reactants can be oxides or nitrides comprising corresponding element respectively.

Second Embodiment

In the present embodiment, five metal oxonitridosilicate phosphors (b) to (f) having the general formula $M_{5-z-a-b}Al_{3+x}Si_{23-x}N_{37-x-2a}O_{x+2a}:Eu_z,Mn_b$ are prepared, wherein M of each phosphor is Sr, x of each phosphor is 2, a of each phosphor is 0, z of each phosphor is 0.1, namely the five phosphors having a formula $Sr_{4.9-b}Al_5Si_{21}N_{35}O_2:Eu_{0.1},Mn_b$, and wherein b is 0.02, 0.04, 0.06, 0.08, 0.1 respectively. Each of the phosphor is prepared by solid-state reaction at high pressure, and the method is shown as follows.

First, a stoichiometric first reactant comprising Sr, such as $Sr_3N_2$; a stoichiometric second reactant comprising Al, such as AlN; a stoichiometric third reactant comprising Si, such as $Si_3N_4$ or $SiO_2$; a stoichiometric fourth reactant comprising Eu, such as EuN; and a stoichiometric fifth reactant comprising Mn, such as $MnO_2$ are provided to form a mixture having a formula $Sr_{4.9-b}Al_5Si_{21}N_{35}O_2:Eu_{0.1},Mn_b$.

Second, a pestle is used to grind and mix the mixture uniformly, and subsequently the uniform mixture is put into a boron nitride crucible, and then the boron nitride crucible is put into a high-temperature sintering furnace to carry out a sintering step under a temperature ranging from 1700° C. to 2300° C. for 3 to 8 hours. More specifically, the mixture is heated to the temperature ranging from 1700° C. to 2300° C. at a heating rate of 35° C./minute under nitrogen atmosphere at a pressure ranging from 0.5 to 1.5 Mpa, and then the mixture is kept for 3 to 8 hours, and subsequently the mixture was cooled down to room temperature at a cooling rate of 15° C./minute. After the sintering step, a pestle is used again to grind the sintered mixture into powders having uniform particle sizes after the sintered mixture is taken out from the high-temperature sintering furnace.

The reactants can be oxides or nitrides comprising corresponding element respectively.

The crystal phase purity and crystal structure of the phosphors of the embodiments are determined by an X-ray diffractometer. FIG. 1 is an XRD pattern of the phosphor (a) in accordance with the first embodiment having a formula $Sr_{4.9}Al_5Si_{21}N_{35}O_2:Eu_{0.1}$, the phosphors (b) to (f) in accordance with the second embodiment having a formula $Sr_{4.9-b}Al_5Si_{21}N_{35}O_2:Eu_{0.1},Mn_b$, and standard compound having a formula $Sr_5Al_5Si_{21}N_{35}O_2$, wherein b of the phosphor (b) to (f) is 0.02, 0.04, 0.06, 0.08, 0.1 respectively. As shown in FIG. 1, phosphors (a) to (f) respectively have pure crystal phases instead of impurity crystal phases.

Figure 2:
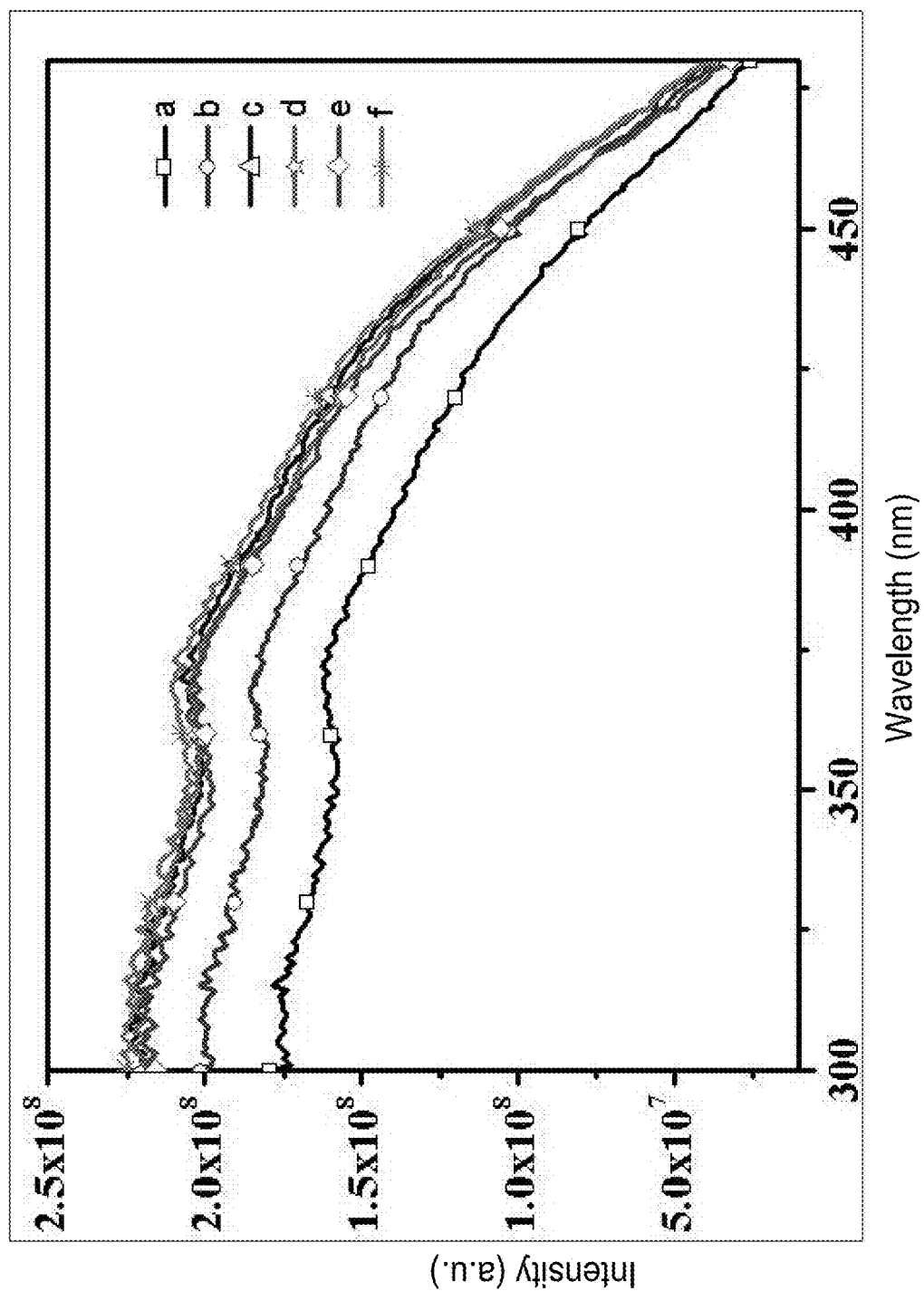
FIG. 2 is an excitation spectrum of the phosphor (a) in accordance with the first embodiment and the phosphors (b) to (f) in accordance with the second embodiment of the application.

Referring to FIG. 2, which is an excitation spectrum of the phosphor (a) in accordance with the first embodiment having a formula $Sr_{4.9}Al_5Si_{21}N_{35}O_2:Eu_{0.1}$, the phosphors (b) to (f) in accordance with the second embodiment having a formula $Sr_{4.9-b}Al_5Si_{21}N_{35}O_2:Eu_{0.1},Mn_b$, wherein b of the phosphor (b) to (f) is 0.02, 0.04, 0.06, 0.08, 0.1 respectively. As shown in FIG. 2, the phosphors are suitable for being excited with ultraviolet (UV) light or blue light, which is an excitation source having a wavelength ranging from 300 nm to 460 nm from a light-emitting diode or plasma. Accordingly, the metal oxonitridosilicate phosphor of the application is suitable for being exited with a wide excitation wavelength.

Figure 3:
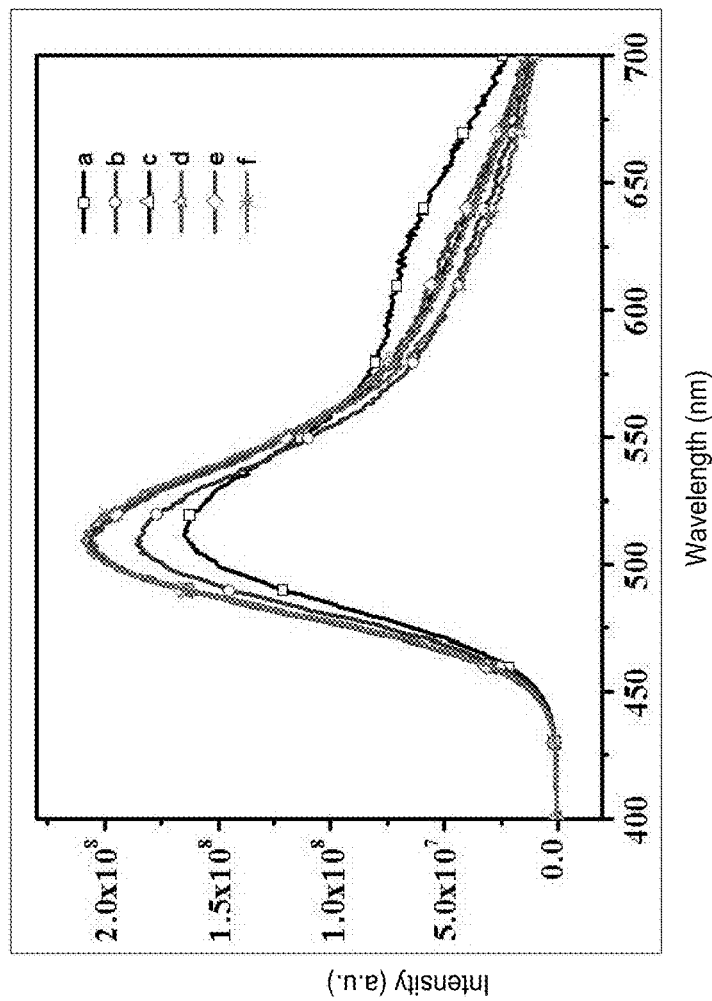
FIG. 3 is an emission spectrum of the phosphor (a) in accordance with the first embodiment and the phosphors (b) to (f) of the second embodiment of the application under an excitation wavelength ranging from 300 nm to 460 nm.

Referring to FIG. 3, which is an emission spectrum of the phosphor (a) in accordance with the first embodiment having a formula $Sr_{4.9}Al_{15}Si_{21}N_{35}O_2:Eu_{0.1}$, the phosphors (b) to (f) in accordance with the second embodiment having a formula $Sr_{4.9-b}Al_5Si_{21}N_{35}O_2:Eu_{0.1},Mn_b$, wherein b of the phosphors (b) to (f) is 0.02, 0.04, 0.06, 0.08, 0.1 respectively. As shown in FIG. 3, under an excitation source having a wavelength ranging from 300 nm to 460 nm, the strongest emission intensity is in a wavelength ranging from 480 nm to 700 nm. As a result, the phosphors of the application emitting green light. Besides, when Mn as a second active center is added, each emission intensity of phosphors (b) to (f) is stronger than the emission intensity of the phosphor (a), which only has Eu as a first active center. Furthermore, the emission intensity is stronger as the amount of Mn increases.

Table 1 shows chromaticity coordinates of the phosphor (a) in accordance with the first embodiment having a formula $Sr_{4.9}Al_5Si_{21}N_{35}O_2:Eu_{0.1}$, the phosphors (b) to (f) in accordance with the second embodiment having a formula $Sr_{4.9-b}Al_5Si_{21}N_{35}O_2:Eu_{0.1}, Mn_b$, wherein b of the phosphor (b) to (f) is 0.02, 0.04, 0.06, 0.08, 0.1 respectively. The chromaticity coordinates are obtained by converting the data by the equation standardized by Commission internationale de l'éclairage (CIE), wherein the data are obtained from the emission spectrum. Furthermore, FIG. 4 shows a CIE chromaticity diagram of the phosphors (a) to (f). As shown in FIG. 4, the light emitted by the phosphors of the embodiments of the present application lies in the green region of CIE color coordinate and is with high color purity.

TABLE 1

The chromaticity coordinates of the phosphor (a) to (f)

| | Chromaticity Coordinates | |
|---|---|---|
| | CIEx | CIEy |
| a | 0.3385 | 0.5085 |
| b | 0.2854 | 0.5201 |
| c | 0.2886 | 0.5149 |
| d | 0.2753 | 0.5203 |
| e | 0.2917 | 0.5103 |
| f | 0.2863 | 0.5180 |

The foregoing description of preferred and other embodiments in the present disclosure is not intended to limit or restrict the scope or applicability of the inventive concepts conceived by the Applicant. In exchange for disclosing the inventive concepts contained herein, the Applicant desires all patent rights afforded by the appended claims. Therefore, it is intended that the appended claims include all modifications and alterations to the full extent that they come within the scope of the following claims or the equivalents thereof.

What is claimed is:

1. A metal oxonitridosilicate phosphor of a general formula $M_{5-z-a-b}Al_{3+x}Si_{23-x}N_{37-x-2a}O_{x+2a}:Eu_z,Mn_b$,
wherein M is one or more alkaline earth metals; $0 \leq x \leq 7$; $0 \leq a \leq 1$; $0 < z \leq 0.3$; and $0 < b \leq 0.3$, and
wherein the metal oxonitridosilicate phosphor is configured to emit a light with a CIEx between 0.2753 and 0.2917 and a CIEy between 0.5103 and 0.5203.

2. The metal oxonitridosilicate phosphor according to claim 1, wherein $M_{5-z-a-b}Al_{3+x}Si_{23-x}N_{37-x-2a}O_{x+2a}$ in the general formula is a host lattice, Eu is a first active center and Mn is a second active center.

3. The metal oxonitridosilicate phosphor according to claim 1, emitting a fluorescence with a wavelength ranging from 480 nm to 700 nm when excited by a light source with a wavelength ranging from 300 nm to 460 nm.

4. The metal oxonitridosilicate phosphor according to claim 3, wherein the light source with the wavelength ranging from 300 nm to 460 nm is from a light-emitting diode or plasma.

5. The metal oxonitridosilicate phosphor according to claim 3, emitting a green fluorescence when excited by the light source with the wavelength ranging from 300 nm to 460 nm.

6. A manufacturing method of the metal oxonitridosilicate phosphor according to claim 1, comprising the steps of:
mixing a first reactant comprising a material selected from the group consisting of strontium oxide and strontium nitride, a second reactant comprising Al, a third reactant comprising Si, a fourth reactant comprising Eu, and a fifth reactant comprising Mn to form a mixture; and
forming the mixture into a metal oxonitridosilicate phosphor with a general formula $M_{5-z-a-b}Al_{3+x}Si_{23-x}N_{37-x-2a}O_{x+2a}:Eu_z,Mn_b$ by solid-state reaction at a pressure ranging from 0.5 MPa to 1.5 MPa, wherein $0 \leq x \leq 7$; $0 \leq a \leq 1$; $0 < z \leq 0.3$; and $0 < b \leq 0.3$, and the phosphor emits a fluorescence with a wavelength ranging from 480 nm to 700 nm when excited by a light source with a wavelength ranging from 300 nm to 460 nm.

7. The manufacturing method of a metal oxonitridosilicate phosphor according to claim 6, wherein $M_{5-z-a-b}Al_{3+x}Si_{23-x}N_{37-x-2a}O_{x+2a}$ in the general formula is a host lattice, Eu is a first active center and Mn is a second active center.

8. The manufacturing method of a metal oxonitridosilicate phosphor according to claim 6, wherein the second reactant comprising Al, the third reactant comprising Si, the fourth reactant comprising Eu, and the fifth reactant comprising Mn respectively comprise a material selected from the group consisting of oxides and nitrides.

9. The manufacturing method of a metal oxonitridosilicate phosphor according to claim 6, wherein forming the mixture into a metal oxonitridosilicate phosphor by solid-state reaction at high pressure comprises forming the mixture into a metal oxonitridosilicate phosphor under nitrogen atmosphere, at a temperature ranging from 1700° C. to 2300° C. for 3 to 8 hours.

10. The manufacturing method of a metal oxonitridosilicate phosphor according to claim 6, further comprising grinding the mixture after forming the mixture into the metal oxonitridosilicate phosphor by solid-state reaction.

11. The metal oxonitridosilicate phosphor according to claim 1, wherein z>b.

* * * * *